(12) United States Patent
Shang et al.

(10) Patent No.: US 9,424,744 B2
(45) Date of Patent: Aug. 23, 2016

(54) METHOD AND APPARATUS FOR TRAFFIC MANAGEMENT

(75) Inventors: Wei Xiong Shang, Beijing (CN); Hua Yong Wang, Beijing (CN); Zhe Xiang, Beijing (CN); Chun Ying, Beijing (CN); Jin Z. Zhou, Beijing (CN); Yan Feng Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 13/505,165

(22) PCT Filed: Oct. 18, 2010

(86) PCT No.: PCT/EP2010/065586
§ 371 (c)(1),
(2), (4) Date: Apr. 30, 2012

(87) PCT Pub. No.: WO2011/051125
PCT Pub. Date: May 5, 2011

(65) Prior Publication Data
US 2012/0221232 A1 Aug. 30, 2012

(30) Foreign Application Priority Data
Oct. 30, 2009 (CN) .......................... 2009 1 0211312

(51) Int. Cl.
*G08G 1/01* (2006.01)
*H04W 4/02* (2009.01)
*H04W 4/04* (2009.01)

(52) U.S. Cl.
CPC .......... *G08G 1/0104* (2013.01); *H04W 4/026* (2013.01); *H04W 4/028* (2013.01); *H04W 4/046* (2013.01)

(58) Field of Classification Search
CPC ........ G08G 1/00; G08G 1/133; G08G 1/129; G08G 1/20; G08G 1/0104; B61L 2205/02; G01S 5/10; G06Q 30/0267
USPC ........ 701/117, 119, 118, 411, 423, 424, 533; 455/435.1, 440, 456.1
See application file for complete search history.

(56) References Cited

U.S. PATENT DOCUMENTS 6,198,930 B1 3/2001 Schipper
7,100,089 B1 8/2006 Phelps
(Continued)

FOREIGN PATENT DOCUMENTS

EP 1 804 167 A2 7/2007
JP 200534100 A 11/2005
(Continued)

OTHER PUBLICATIONS

Valerio, et al., "Exploiting cellular networks for road traffic estimation: a survey and a research roadmap," IEEE 69th [] Vehicular Technology Conference, Apr. 26-29, 2009, pp. 1-5.*

(Continued)

*Primary Examiner* — Yuri Kan
(74) *Attorney, Agent, or Firm* — Scully, Scott, Murphy & Presser, P.C.; David Quinn, Esq.

(57) ABSTRACT

A method for determining travel time of a vehicle on a road, wherein the vehicle is operable within a mobile communication network, comprising: collecting historical communication events of a mobile user in order to obtain travel samples, wherein the historical communication events indicate when the mobile user travelled along a monitored road; determining a cell handover sequence from the historical communication events; determining from the cell handover sequence, one of more road segments of the monitored road; determining the travel time of the one or more road segments according to the travel time samples; selecting, for an undetermined road segment of the monitored road for which the real-time travel time is not determined from the collected historical communication events, a candidate mobile user that is most likely to appear on the undetermined road segment; actively positioning the candidate mobile user to obtain positioning information; and returning to the step of collecting communication events of a mobile user currently on a monitored road with the active positioning as one communication event for the candidate mobile user, to determine the real-time travel time of the undetermined road segment.

26 Claims, 4 Drawing Sheets

(56) References Cited

U.S. PATENT DOCUMENTS

| | | | |
|---|---|---|---|
| 7,392,056 B2 | 6/2008 | Corson et al. | |
| 7,447,997 B2 | 11/2008 | Colle | |
| 7,908,080 B2* | 3/2011 | Rowley | G06Q 30/0267 340/995.13 |
| 8,606,514 B2* | 12/2013 | Rowley | G06Q 30/0267 701/424 |
| 8,798,917 B2* | 8/2014 | Rowley | G06Q 30/0267 701/411 |
| 2004/0001544 A1 | 1/2004 | Mehrotra | |
| 2005/0015376 A1 | 1/2005 | Fraser et al. | |
| 2005/0037772 A1* | 2/2005 | Alger et al. | 455/456.1 |
| 2005/0227696 A1* | 10/2005 | Kaplan et al. | 455/440 |
| 2007/0123271 A1 | 5/2007 | Dickinson | |
| 2007/0167145 A1* | 7/2007 | Bonnenfant | 455/404.1 |
| 2007/0198605 A1 | 8/2007 | Saika | |
| 2008/0071465 A1* | 3/2008 | Chapman et al. | 701/117 |
| 2008/0282160 A1 | 11/2008 | Tonnison et al. | |
| 2010/0178931 A1* | 7/2010 | Busropan et al. | 455/456.1 |
| 2014/0372033 A1* | 12/2014 | Rowley | G06Q 30/0267 701/533 |

FOREIGN PATENT DOCUMENTS

| | | |
|---|---|---|
| JP | 2006285567 A | 10/2006 |
| JP | 2006293491 A | 10/2006 |
| JP | 2007133828 A | 5/2007 |
| JP | 20090529186 A | 8/2009 |
| TW | 200503520 | 1/2005 |

OTHER PUBLICATIONS

English language Abstract, WO2004010401(A2), dated Jan. 29, 2004.
English language Abstract, WO2005098780(A1), dated Oct. 20, 2005.
English language Abstract, CN101510357(A), dated Aug. 19, 2009.
English language Abstract, EP1804167(A2), dated Jul. 4, 2007.
Chinese Office Action mailed Jun. 3, 2013.
Choujan et al., "Aligning Activity Sequences for Continuous Tracking of Cellphone Users", IEEE 2009, http://ieeexplore.ieee.org/stamp/stamp.jsp?tp=arnumber=4912833&isnumber=4912739.
Verma, "Personal Communications Networking Architecture and Functionality Evolution", IEEE Region 10 Conference, Tencon 92, Nov. 11-13, 1992, Melbourne, Australia, http://ieeexplore.ieee.org/Xplore/login.jsp?url=http%3A3D271952&authDecision=-203, pp. 217-221.
Official Action dated Jul. 1, 2014 received from the Japanese Patent Office.
Valerio, et al., "Exploiting cellular networks for road traffic estimation: a survey and a research roadmap," IEEE 69th Vehicular Technology Conference, Apr. 26-29, 2009, pp. 1-5.

* cited by examiner

METHOD AND APPARATUS FOR TRAFFIC MANAGEMENT

TECHNICAL FIELD

The present invention relates to the field of road traffic management and mobile communication technology. In particular, the invention relates to the technology of monitoring road traffic by determining the real-time travel time of a vehicle on a road based on a mobile communication network.

BACKGROUND OF THE INVENTION

Road traffic monitoring is an important topic in road traffic management and navigation system. The traffic monitoring may be used to generate basic information for the road traffic, such as average speed of a vehicle, travel time of a road, road congestion degree, and incident position etc. By providing real-time basic information, the navigation system can learn the road traffic situation in time and reasonably arrange driving trajectories for the vehicles, thereby effectively reducing the congestion and avoiding collisions.

Common solutions for monitoring road traffic based on traffic sensors (such as inductive loop detectors) and GPS floating cars (such as taxis provided with GPS) have been applied to the urban roads. However, this solution has not been applied to the vast suburban roads and inter-cities roads. This is mainly because that: 1) the traffic sensor is expensive in both deployment and maintenance, and it is not suitable for suburban deployment; 2) the GPS floating car based solution highly depends on the number of floating cars on the monitored road, and in fact there is few floating cars running on the suburban and inter-cities roads.

Currently, mobile communication networks, such as 2G/3G mobile communication networks, have covered over 90% of the regions of many counties and over 70% people use cell phones everyday. When communication behaviours happen, such as send/receive a short message, initiate/receive a call or perform handover during a session, the network would record the position of the base stations currently providing the corresponding service. Thus, the mobile communication networks may also be considered for monitoring the road traffic.

In the existing mobile communication networks based road traffic monitoring solution, a moving speed of a mobile user may be calculated by recording the position information and time of two continuous communication events when the mobile user takes two communication behaviours on the monitored road, and therefore the traffic situation of the monitored road may be evaluated. However, such a solution depends on the number of the communication events happened on the monitored road, and it can not work if no communication events happen on the monitored road.

In addition, this solution is disadvantageous when the time difference between two continuous communication events is large, because the speed of the vehicle usually varies seriously during a long time interval. Typically, the suburban roads and inter-cities roads have different traffic environment, for example, for an inter-cities road travel some villages, the travel speed of the vehicle varies with positions, for example, it would be slow when approaching a village and would be fast when leaving the village. Thus the solution can not evaluate the traffic situation of a road accurately.

Most mobile communication networks have a function of active positioning, which has been widely employed in Location-Based-Service (LBS). By actively paging the phone of the mobile user, the position of the mobile user can be determined However, the function of active positioning will trigger signalling interaction between the base station and the mobile phone, which would cost a large amount of wireless resources.

U.S. Pat. No. 6,198,630 a system for tracking the location of, and for providing cellular telephone handoff for, a mobile cellphone user as the cellphone user moves from one cell-zone to another. However, there is still a need in the art to provide a solution to alleviate the above mentioned problems.

SUMMARY OF THE INVENTION

The present invention is proposed in view of the above technical problems, and its purpose is to provide a method and apparatus for determining real-time travel time of a vehicle on a road based on mobile communication network, which can accurately provide road traffic situation in real-time, cover all the roads and have low cost.

According to a first aspect, the present invention provides a method for determining travel time of a vehicle on a road, wherein the vehicle is operable within a mobile communication network, comprising: collecting historical communication events of a mobile user in order to obtain travel samples, wherein the historical communication events indicate when the mobile user travelled along a monitored road; determining a cell handover sequence from the historical communication events; determining from the cell handover sequence, one of more road segments of the monitored road; determining the travel time of the one or more road segments according to the travel time samples; selecting, for an undetermined road segment of the monitored road for which the real-time travel time is not determined from the collected historical communication events, a candidate mobile user that is most likely to appear on the undetermined road segment; actively positioning the candidate mobile user to obtain positioning information; and returning to the step of collecting communication events of a mobile user currently on a monitored road with the active positioning as one communication event for the candidate mobile user, to determine the real-time travel time of the undetermined road segment.

Preferably, the present invention provides a method wherein the step of collecting communication events happened to a mobile user currently on a monitored road to obtain travel time samples comprises: collecting two continuous communication events happened to the same mobile user within a predetermined time period; and recording positions of cells in which the two communication events happened and a time difference between the two communication events as the travel time sample.

Preferably, the present invention provides a method wherein the step of determining the real-time travel time of corresponding road segment in the monitored road according to the travel time samples comprises: determining, for each of the travel time samples, whether the positions of two cells in the travel time sample are the same, and determining that the travel time sample is a valid travel time sample when the positions of these two cells are different; selecting, from the valid travel time samples, an unambiguous sample that can uniquely determine the real-time travel time of a certain road segment; identifying the certain road segment with the unambiguous sample; comparing, for an ambiguous sample in the valid travel time samples, the time difference in the ambiguous sample with a sum of the real-time travel time of the respective constituent road segments of each of the possible road segments corresponding to the ambiguous sample to select the possible road segment that is nearest in time, wherein for the constituent road segment for which the real-time travel time is not determined, a baseline travel time of the constituent road segment is used to replace its real-time travel time; and identifying the possible road segment that is nearest in time with the ambiguous sample.

Preferably, the present invention provides a method wherein the step of determining the real-time travel time of corresponding road segment in the monitored road according to the travel time samples further comprises: determining whether these two cells are neighbouring cells when the positions of these two cells are different; and determining that the travel time sample is valid when these two cells are not the neighbouring cells.

Preferably, the present invention provides a method wherein the step of determining the real-time travel time of corresponding road segment on the monitored road according to the travel time samples further comprises: calculating arithmetic average value of unambiguous samples when a plurality of unambiguous samples exists for the same road segment; and identifying the road segment with the arithmetic average value.

Preferably, the present invention provides a method wherein the step of selecting, for an undetermined road segment on the monitored road for which the real-time travel time is not determined, a candidate mobile user that is most likely to appear on the undetermined road segment comprises: analyzing moving modes and speed vectors of the corresponding mobile users on the monitored road according to the valid travel time samples; estimating, the speed of each corresponding mobile user passing the undetermined road segment from current time to specified time; calculating, travel probability of each mobile user, passing the undetermined road segment at the specified time according to the speed vector and the estimated speed of the mobile user; and selecting a certain number of mobile users with large travel probability as the candidate mobile user.

Preferably, the present invention provides a method wherein the step of estimating, for each of the corresponding mobile users, a travel speed at which the mobile user passes the undetermined road segment from current time to specified time comprises: estimating a minimum travel speed of the mobile user according to $$V_{min} = \frac{E[d] - R + K}{t - T},$$

wherein E[d] represents a distance from the position of the cell to which the mobile user belongs at current time to a start point of the undetermined road segment, R represents a coverage radius of the cell, K represents a length of the undetermined road segment, t represents the specified time, T represents the current time; and estimating a maximum travel speed of the mobile user according to $$V_{max} = \frac{E[d] + R + K}{t - T};$$

wherein the step of calculating a travel probability that the mobile user can pass the undetermined road segment at the specified time comprises: calculating a prediction-related coefficient between the speed vector and the travel speed of the mobile user according to $$C = \min\left(1, \frac{V - V_{min}}{V_{max} - V_{min}}\right),$$

as the travel probability of the mobile user, wherein V represents the speed vector of the mobile user.

Preferably, the present invention provides a method wherein the step of selecting a candidate mobile user that is most likely to appear on the undetermined road segment further comprises: selecting a mobile user to whom only one communication event happened in a previous road segment of the undetermined road segment as a candidate mobile user.

Preferably, the present invention provides a method further comprising: before the step of collecting communication events happened to a mobile user currently on a monitored road, dividing the monitored road into a plurality of road segments according to cells related to the monitored road; and baselining historical travel time for the road segments to obtain baseline travel time of the respective road segments.

Preferably, the present invention provides a method wherein the step of dividing the monitored road into a plurality of road segments according to cells related to the monitored road comprises: obtaining all cells within a certain range along the monitored road and their position information; querying historical handover records related to the cells to find a cell handover sequence corresponding to the monitored road; and segmenting the monitored road into a plurality of road segments according to the cell handover sequence, wherein middle points between two neighbouring cells are regarded as borders of the respective road segments.

Preferably, the present invention provides a method wherein the step of baselining historical travel time for the road segments to obtain baseline travel time of the respective road segments comprising: counting the historical travel time for the road segment according to historical handover records in the cell handover sequence; and filtering interference time out from the historical travel time to generate the baseline travel time of the road segment.

Preferably, the present invention provides a method wherein the communication event is any one of location update service, call/short message service and cell handover.

An apparatus for determining travel time of a vehicle on a road, wherein the vehicle is operable within a mobile communication network, comprising: a collecting module for collecting historical communication events of a mobile user in order to obtain travel samples, wherein the historical communication events indicate when the mobile user travelled along a monitored road; a travel time determining module for determining a cell handover sequence from the historical communication events; a travel time determining module for determining from the cell handover sequence, one of more road segments of the monitored road; determining the travel time of the one or more road segments according to the travel time samples; a selection module for selecting, for an undetermined road segment of the monitored road for which the real-time travel time is not determined from the collected historical communication events, a candidate mobile user that is most likely to appear on the undetermined road segment; an active positioning module for actively positioning the candidate mobile user to obtain positioning information; and returning to the collecting module for collecting communication events of a mobile user currently on a monitored road with the active positioning as one communication event for the candidate mobile user, to determine the real-time travel time of the undetermined road segment.

Preferably, the present invention provides an apparatus wherein the collecting module comprises: a collecting unit that collects two continuous communication events happened to the same mobile user within a predetermined time period; and a recording unit that records the positions of the cells in which these two communication events happened and a time difference between these two communication events as the travel time sample.

Preferably, the present invention provides an apparatus wherein the travel time determining module comprises: a determining unit that determines, for each of the travel time samples, whether the positions of two cells in the travel time sample are the same, and determining that the travel time sample is a valid travel time sample when the positions of these two cells are different; a sample selecting unit that selects from the valid travel time samples an unambiguous sample that can uniquely determine the real-time travel time of a certain road segment; an identifying unit that identifying the certain road segment with the unambiguous sample; a comparing and selecting unit that compares, for an ambiguous sample in the valid travel time samples, a time difference in the ambiguous sample with a sum of the real-time travel time of the respective constituent road segments of each of the possible road segments corresponding to the ambiguous sample to select the possible road segment that is nearest in time, wherein for the constituent road segment for which the real-time travel time is not determined, its real-time travel time is replaced with a baseline travel time of the constituent road segment; wherein the identifying unit is configured to identify the possible road segment that is nearest in time with the ambiguous sample.

Preferably, the present invention provides an apparatus wherein the determining unit is further configured to determine whether these two cells are neighbouring cells when the positions of these two cells are different, and to determine that the travel time sample is valid when these two cells are not neighbouring cells.

Preferably, the present invention provides an apparatus wherein the travel time determining module further comprises: an average value calculating unit that calculates when a plurality of unambiguous samples exists for the same road segment, an arithmetic average value of the plurality of unambiguous samples; wherein the identifying unit is configured to identify the road segment with the arithmetic average value.

Preferably, the present invention provides an apparatus wherein the selecting module comprises: an analyzing unit that analyzes moving modes and speed vectors of the corresponding mobile users on the monitored road according to the valid travel time samples; an estimating unit that estimates, for each of the corresponding mobile users, a travel speed at which the mobile user passes the undetermined road segment from current time to specified time; a probability calculating unit that calculates, for each of the mobile users, a travel probability that the mobile user can pass the undetermined road segment at the specified time according to the speed vector and the estimated travel speed of the mobile user; and a user selecting unit that selects a certain number of mobile users with large travel probability as the candidate mobile user.

Preferably, the present invention provides an apparatus wherein the estimating unit is configured to estimate a minimum travel speed of the mobile user according to $$V_{min} = \frac{E[d] - R + K}{t - T},$$

wherein E[d] represents a distance from the position of the cell to which the mobile user belongs at current time to a start point of the undetermined road segment, R represents a coverage radius of the cell, K represents a length of the undetermined road segment, t represents the specified time, T represents the current time; and to estimate a maximum travel speed of the mobile user according to $$V_{max} = \frac{E[d] + R + K}{t - T};$$

the probability calculating unit is configured to calculate a prediction-related coefficient between the speed vector and the travel speed of the mobile user as the travel probability of the mobile user according to $$C = \min\left(1, \frac{V - V_{min}}{V_{max} - V_{min}}\right),$$

wherein V represents the speed vector of the mobile user.

Preferably, the present invention provides an apparatus wherein the user selecting unit is further configured to select the mobile user to whom only one communication event happened in a previous road segment of the undetermined road segment.

Preferably, the present invention provides an apparatus further comprising: a road segmentation module that divides the monitored road into a plurality of road segments according to cells related to the monitored road; and a baselining module that baselines historical travel time for the road segments to obtain the baseline travel time of the respective road segments.

Preferably, the present invention provides an apparatus wherein the road segmentation module comprises: a cell coverage calculation unit that obtains all the cells within a certain range along the monitored road and their position information; a querying unit that queries historical handover records related to the cells to find a cell handover sequence corresponding to the monitored road; and a segmenting unit that segments the monitored road into a plurality of road segments according to the cell handover sequence, wherein middle points between two neighbouring cells are regarded as borders of the respective road segments.

Preferably, the present invention provides an apparatus wherein the baselining module comprises: a counting unit that counts the historical travel time for the road segment according to the historical handover records in the cell handover sequence; and a baseline travel time generating unit that filters interference time out from the historical travel time to generate the baseline travel time of the road segment.

BRIEF DESCRIPTION OF THE DRAWINGS

A preferred embodiment of the present invention will now be described by way of example only, with reference to the accompanying drawings in which.

DETAILED DESCRIPTION OF THE PREFERRED EMBODIMENT

It is believed that the above and other objects, features and advantages of the present invention will be more apparent from the following detailed description of the embodiments in conjunction with accompany drawings.

Figure 1:
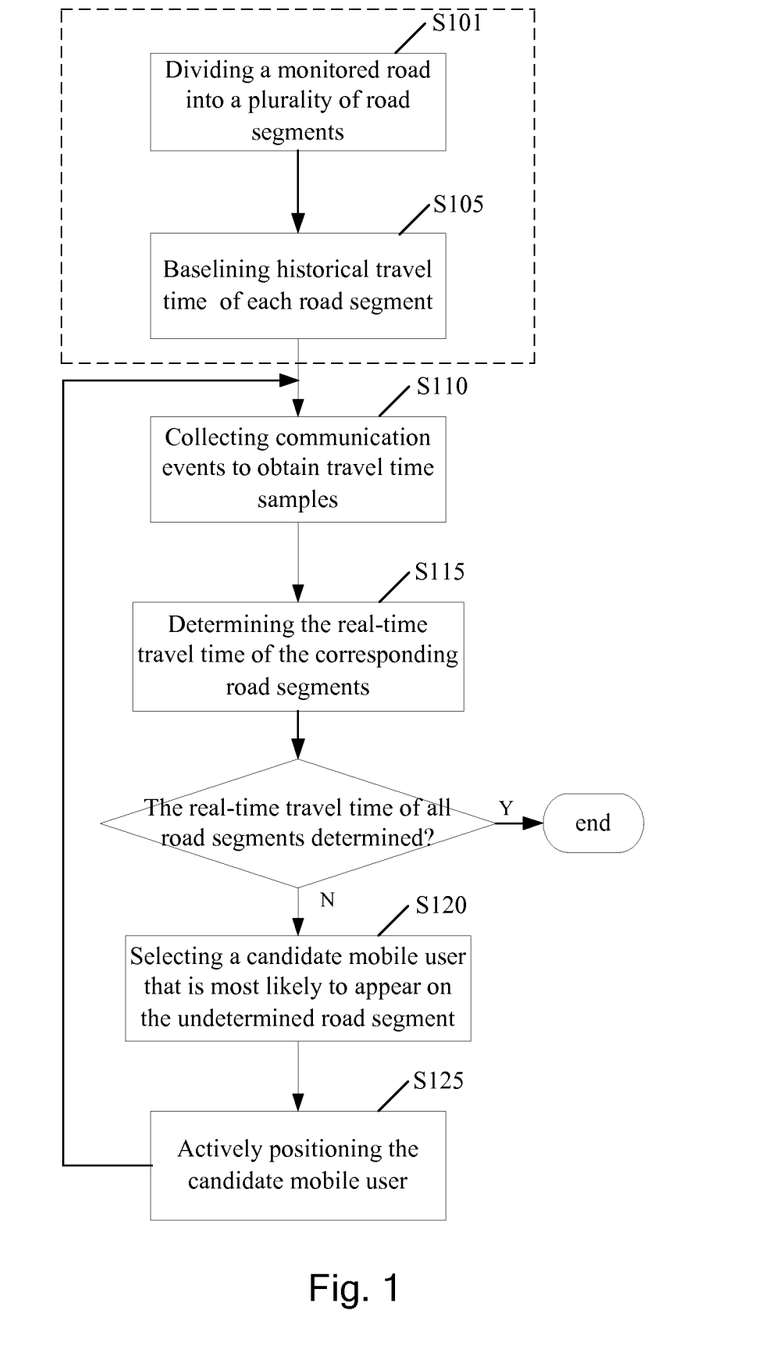
FIG. 1 is a flowchart of a method for determining real-time travel time of a road based on mobile communication network according to a preferred embodiment of the present invention.

FIG. 1 is a flowchart of a method for determining real-time travel time of a road based on mobile communication network according to an embodiment of the invention. The embodiment will be described in detail in conjunction with the drawing.

It is well known that the mobile communication network consists of mobile terminals, base stations, and mobile switching centers etc. The base station may be an omni-directional base station which covers one cell, or a direction-oriented base station which covers many cells, e.g., three cells. When a communication event happens to the mobile terminal, for example, the mobile terminal enters into a new cell for position update, sends/receives a short message, initiates/receives a call, or performs handover during a session, the base station and the mobile switching center will accordingly record the time the communication event happened and the position of the cell providing the service. The present embodiment utilizes such information to monitor the road traffic.

As shown in FIG. 1, at step S101, after selecting a monitored road, the monitored road is divided into a plurality of road segments according to the cells in the mobile communication network that are related to the monitored road.

In the present embodiment, first, all the cells within a certain range along the monitored road and their position information are obtained according to the mobile communication network deployment, for example, the cells within 1 kilometer far from both sides of the monitored road. Next, historical handover records related to these obtained cells are queried to find a cell handover sequence corresponding to the monitored road, which is regarded as an association sequence between the monitored road and the base stations. Generally, the historical handover records of the cells are stored in the base station controller. The historical handover records of the cells within a time period can be obtained by querying the base station controller. The cell handover sequence indicates the historical handover sequence when a mobile user was moving on the monitored road and was in session state. Then, the monitored road is segmented into a plurality of road segments based on the cell handover sequence.

Since a cell has certain coverage, in the present embodiment, middle points between two neighbouring cells in the cell handover sequence are regarded as borders of the respective road segments, and the respective road segments are identified by the respective border points. For example, assume that the obtained cell handover sequence is cell A-B-C-D-E, and the start point of the monitored road is denoted as "a", the middle point between the cells A and B is denoted as "b", the middle point between the cells B and C is denoted as "c", the middle point between the cells C and D is denoted as "d", the middle point between the cells D and E is denoted as "e", and the end point of the monitored road is denoted as "f". Then the road segment corresponding to the cell A can be represented by (a, b), the road segment corresponding to the cell B can be represented by (b, c), the road segment corresponding to the cell C can be represented by (c, d), the road segment corresponding to the cell D can be represented by (d, e), and the road segment corresponding to the cell E can be represented by (e, f). In case of the omni-directional base stations, the middle points between these two neighbouring base stations can also be used as the borders of the respective road segments.

Next, at step S105, the historical travel time for the plurality of road segments are baselined to obtain the baseline travel time of the respective road segments.

In the present embodiment, first, the historical travel time for each road segment is counted based on the historical handover records in the cell handover sequence obtained in step S101. As mentioned above, the border of the respective road segments is the middle point between these two neighbouring cells, that is, the handover point for these two cells. Thus, a time difference between these two neighbouring handover points can be obtained by means of the handover records, thereby obtaining the travel time of the corresponding road segment. Generally, the historical handover records within a longer time period are selected, for example, the records within the past three months, to count the historical travel time more accurately. Then, for each of the road segments, interference time, such as the interference time caused by walking (which causes the travel time to be too long) and base station edge handover (which causes the travel time to be too short), is filtered out from the historical travel time to generate the baseline travel time of each road segment. Specifically, a probability distribution diagram of the historical travel time can be generated based on the counted historical travel time.

Figure 2:
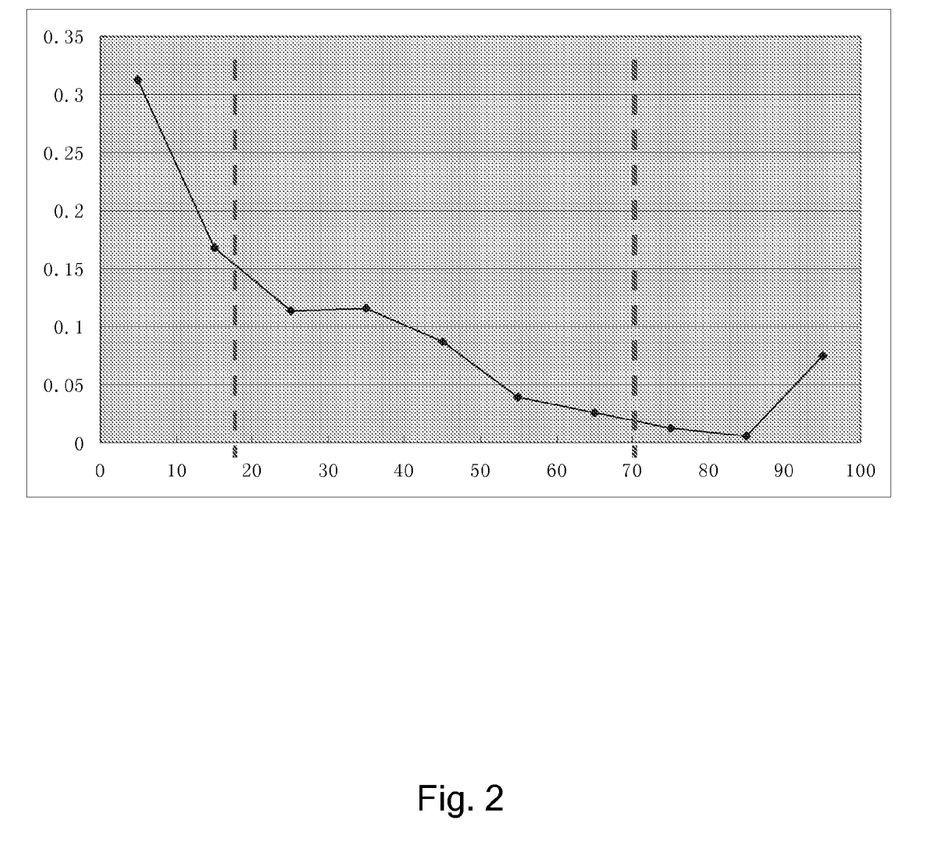
FIG. 2 is a diagram depicting probability distribution of the historical travel time.

FIG. 2 shows the probability distribution of the historical travel time of a certain road segment, wherein the horizontal axis represents time and the vertical axis represents probability. Then, the time values which are too small or too large, such as the time values which are below 20 seconds or above 70 seconds in FIG. 2, are removed from the probability distribution diagram, a probability averaging method is then applied to calculate the baseline travel time of the certain road segment.

Those skilled in the art will appreciate that the operation of the above steps S101 and S105 are the processes on the monitored road, which can be performed in advance and are not necessarily to be included in the method of the present embodiment.

Then, at step S110, the communication events happened to a mobile user currently on the monitored road are collected to obtain the travel time samples. In the present embodiment, the communication events may be any one of location update service, call/short message service and cell handover.

First, two continuous communication events happened to the same mobile user within a predetermined time period are collected. Here, the predetermined time period is an observation window which may be set to several minutes to several hours as needed. The so-called "two continuous communication events" means that these two communication events are neighboured in the happening sequence, for example, these two communication events happen continuously or there is a time interval between these two communication events, both of which belong to "two continuous communication events". Next, the positions of the cells in which these two communication events happened and a time difference between these two communication events are recorded as the travel time sample, which indicates the time consumed from the start point of the cell in which the first communication event happened to the start point of the cell in which the second communication event happened.

The generation of the travel time sample will be explained below by way of an example. In this example, assume that the base stations in the mobile communication network are the omni-directional base stations, each of which covers only one cell, and then the cell can be identified by the identifier of the corresponding base station. A mobile user uses the short message service at time 8:46 via the base station A, the position (latitude, longitude) of the base station A (cell A) is (39.65722035, 116.381390249) and its coverage radius is 2000 meters; the mobile user makes a phone call at time 9:40 via the base station B, the position (longitude, latitude) of the base station B (cell B) is (39.51223035, 116.30998024) and its coverage radius is 1400 meters. For simplicity, in the travel time sample, the identifier of the cell may be used to replace the position of the cell, that is, the travel time sample may be represent as (A, B, 54 minutes).

Next, at step S115, the real-time travel time of the corresponding road segments in the monitored road are determined according to the travel time samples obtained in step S110.

In the present embodiment, first, the valid travel time samples are extracted from the obtained travel time samples, because some travel time samples can not be used to calculate the moving speed of the mobile user. Specifically, for each of the travel time samples, it is determined whether the positions of two cells in the travel time samples are the same, and the travel time sample would be ignored if the positions of these two cells are the same. If these two cells are different cells, it is determined that the travel time sample is a valid travel time sample.

Further, it may also be determined whether these two cells are neighbouring cells if the positions of these two cells are different, and the travel time sample would also be ignored if these two cells are neighbouring cells. The travel time sample is determined as the valid travel time sample if these two cells are not neighbouring cells. Thus, an error due to two communication events happened at the neighbouring border of two cells can be avoided. In this case, the travel time sample is valid only when it includes the positions of two different and non-neighbouring cells.

Then, an unambiguous sample that can uniquely determine the real-time travel time of a certain road segment is selected from the valid travel time samples, and the unambiguous sample is used to identify its corresponding road segment. Further, when a plurality of unambiguous samples exists for the same road segment, an arithmetic average value of the plurality of unambiguous samples is calculated and the arithmetic average value is used as the real-time travel time to identify the road segment. Next, for an ambiguous sample in the valid travel time samples (which means that the road segment corresponding to the sample is not unique), in order to determine its corresponding road segment, a time difference in the ambiguous sample is compared with the sum of the real-time travel time of the respective constituent road segments of each of the possible road segments corresponding to the ambiguous sample, to select the possible road segment that is nearest in time as the road segment corresponding to the ambiguous sample, wherein for the constituent road segment for which the real-time travel time is not determined, the baseline travel time of this road segment instead of the real-time travel time would be used. Then, the possible road segment that is nearest in time is identified with the ambiguous sample.

After the above step S115, it is determined whether there is any undetermined road segment for which the real-time travel time is not determined. If there is no undetermined road segment, that is, the real-time travel time has been determined for all the road segments in the monitored road, the method ends. If there still exists the undetermined road segment, for example, the road segment for which the real-time travel time is replaced with the baseline travel time, or the road segment that is not contained in the travel time samples obtained in step S110, at step S120, for the undetermined road segment on the monitored road where the real-time travel time is not determined, a candidate mobile user that is most likely to appear on the undetermined road segment is selected.

In the present embodiment, the policy for selecting the candidate mobile user is to consider a travel probability that a mobile user can pass the undetermined road segment at a specified time with the current speed vector, and a mobile user with a large probability will be selected as the candidate mobile user. Assume that the length of the undetermined road segment is K, the condition for the mobile user to pass the undetermined road segment at the specific time point t starting from current time T is: the travel speed of the mobile user is larger than $$V(K, t) = \frac{d + K}{t - T},$$

wherein "d" represents a distance from the current position of the mobile user to the start point of the undetermined road segment. Since the current position of the user is within the coverage of the cell to which the user currently belongs, "d" is a variable whose average value is the distance E[d] from the position of the cell to which the user currently belongs to the start point of the undetermined road segment and whose standard deviation is the coverage radius R of the cell. In the present embodiment, the probability that the mobile user can pass the undetermined road segment at time t is measured by a prediction-related coefficient C between the speed vector V of the mobile user and V(K, t).

Assume that the position of the mobile user in the cell at current time is uniformly distributed, and then V(K, t) may be approximately considered as being uniformly distributed between a minimum speed $V_{min}$ and a maximum speed $V_{max}$, wherein the minimum speed $V_{min}$ is calculated based on the following formula (1):

$$V_{min} = \frac{E[d] - R + K}{t - T} \quad (1)$$

and the maximum speed $V_{max}$ is calculated based on the following formula (2):

$$V_{max} = \frac{E[d] + R + K}{t - T} \quad (2)$$

Thus, the prediction-related coefficient C may be obtained based on formula (3):

$$C = \min\left(1, \frac{V - V_{min}}{V_{max} - V_{min}}\right) \quad (3)$$

Specifically, at step S120, first, according to the valid travel time samples obtained in step S115, the moving mode and speed vector of the corresponding mobile users on the monitored road are analyzed. As mentioned above, the travel time sample is generated according to two communication events of the same mobile user, thus the speed vector of the mobile user can be calculated based on the position and time difference of two cells in the valid travel time sample, further, the moving mode (such as walking or driving) of the mobile user can be analyzed. In the present embodiment, the following operations will be performed only on the mobile user whose moving mode is driving. For the travel time sample given above, firstly, the distance between the cells A and B is calculated according to a distance calculation formula that is based on a 84 coordinate system:

$$L = R * \frac{\cos a * \cos b + \cos c * \cos d}{\sqrt{\sin^2 a * \sin^2 c + \sin^2 b * \sin^2 d}}$$

wherein L represents the distance, R represents the radius of the earth, "a" and "b" represents the longitude and latitude of the cell A respectively, "c" and "d" represents the longitude and latitude of the cell B respectively. Then, the speed vector of the mobile user is calculated as V=56 kilometer/hour.

After obtaining the speed vectors of the mobile users driving the car, the travel speed of each of these mobile users travel the undetermined road segment from current time to specified time is estimated, that is, the minimum travel speed and maximum travel speed are estimated based on the above formulae (1) and (2). Then, for each of the mobile user, the travel probability (i.e. the prediction-related coefficient) that the mobile user can pass the undetermined road segment at time t is calculated according to the formula (3) based on the speed vector of the mobile user and the estimated travel speed. Finally, a certain number of mobile users with large travel probability are selected as the candidate mobile user.

The example of utilizing the prediction-related coefficient to measure the travel probability that a mobile user can pass an undetermined road segment at specified time so as to select the candidate mobile user has been described above, however, a person skilled in the art will recognize that other methods for calculating the travel probability that a mobile user can pass an undetermined road segment at specified time may also be utilized.

In the above description about selecting the candidate mobile user, the candidate mobile user is selected from the mobile users that provide the valid travel time samples, that is, the candidate mobile user is selected from the mobile users to which two communication events continuously happened in the different cells.

Further, at step S120, when there is no mobile user to which two continuous communication events happened in different and non-neighbouring cells on a certain undetermined road, the mobile user to which only one communication event happened in a previous road segment of the undetermined road segment may also be selected as the candidate mobile user.

Then, at step S125, the active positioning is performed on the selected candidate mobile user. Active positioning is a common function in the mobile communication network and is known to a person skilled in the art, thus the detailed description is omitted here. Next, the active positioning is regarded as one communication event of the candidate mobile user and the method returns to step S110. The real-time travel time of the undetermined road is determined by performing the steps S110 and S115.

It can be seen from the above description that the method of the present embodiment for determining real-time travel time of a road based on mobile communication network can monitor the traffic condition of the road accurately and in real time by dividing the monitored road into a plurality of road segments and determining the real-time travel time of each road segment according to the communication events happened on the monitored road. It can be applied to various types of road situation, such as urban roads, suburban roads and inter-cities roads etc. In addition, the method of the present embodiment is based on the existing mobile communication network and its cost is very low.

Figure 3:
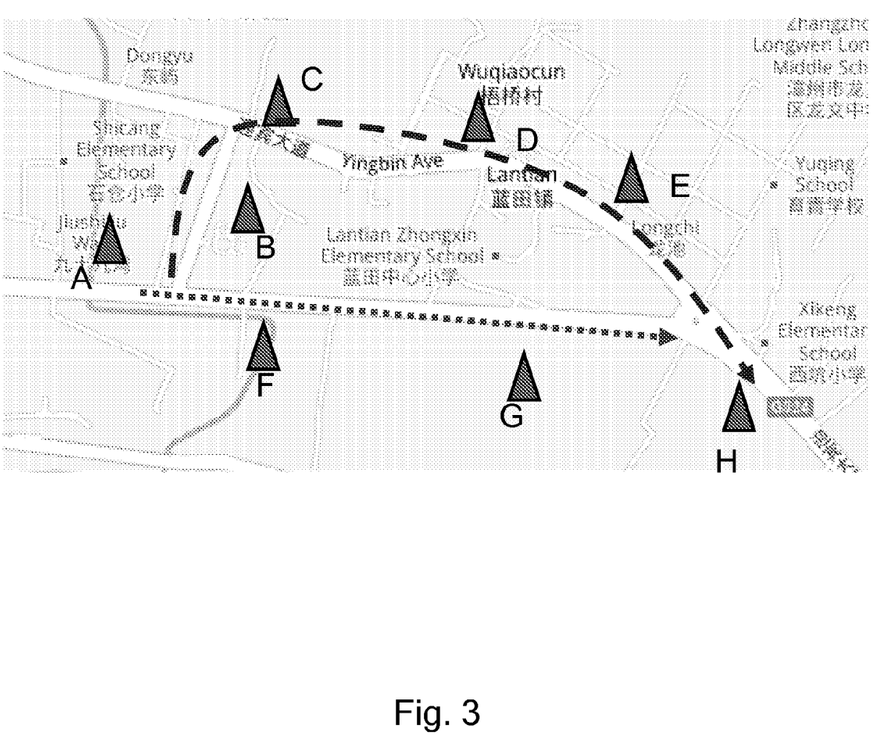
FIG. 3 is a diagram illustrating an example of the method of the embodiment in FIG. 1.

FIG. 3 gives an example of the method of the embodiment in FIG. 1. For the sake of simplicity, each of the base stations is the onmidirectional base station that covers only one cell. Thus, the cell can be identified by the identifier of the corresponding base station. As shown in FIG. 3, assume there are two monitored roads represented by long dashed line arrow and short dashed line arrow respectively, the start and end points are denoted as "a" and "j" respectively. For these two monitored roads, the corresponding cell handover sequences are A-B-C-D-E-H and A-F-G-H respectively, and the middle points between two neighbouring cells are denoted as "b", "c", "d", "e", "h" and "f", "g", "h' " respectively. Accordingly, these two monitored roads are segmented into a plurality of road segments according to the cell handover sequences and can be identified as {a, b}, {b, c}, {c, d}, {d, e}, {e, h}, {h, j}, {a, f}, {f, g}, {g, h'} 和 {h', j}. Then, the baseline travel time of each road segment is obtained, such as {a,b,20s}, {b,c,30s}, {c,d,50s}, {d,e,40s}, {e,h,30s}, {h,j,20s}, {a,f,30s}, {f,g,40s}, {g,h',30s} and {h', j, 30s}. Next, the travel time samples are obtained by collecting two continuous communication events happened to the same mobile user within an observation window (5 minutes), such as {A,H,200s}, {F,H,80s}, {B,D,90s}. In the above travel time samples, {F,H,80s} and {B,D,90s} are the unambiguous samples and can be used as the real-time travel time to directly identify the corresponding road segments {f, h'} and {b, d}. For other road segments {a, b}, {d, e}, {e, h}, {h, j}, {a, f} and { h', j}, they are identified with their baseline travel time to replace the real-time travel time. The ambiguous sample {A,H,200s} corresponds to two possible road segments {a, b, c, d, e, h} and {a, f, g, h'}.

At this point, the sum of the real-time travel time of the respective constituent road segments of the road segment {a, b, c, d, e, h} is 20+90+40+30=180 seconds, the sum of the real-time travel time of the respective constituent road segments of the road segment {a, f, g, h'} is 30+80=110 seconds. Thus, the road segment that is nearest in time is {a, b, c, d, e, h}, therefore, the ambiguous sample {A,H,200s} is used to identify the road segment {a, b, c, d, e, h}. So the undetermined road segments for which the real-time travel time are not determined are {h, j}, {a, f} and {h', j}. Then, for the undetermined road segments, a mobile user that is most likely to appear on these two undetermined road segments in the next observation window is selected and the active positioning is performed on the selected mobile user to obtain the position information. Then the travel time samples are obtained again so as to determine the real-time travel time of the undetermined road segments.

Although two monitored roads are given in the example of FIG. 3, a person skilled in the art will appreciate that the method of the present embodiment can be applied to any number of monitored roads.

Figure 4:
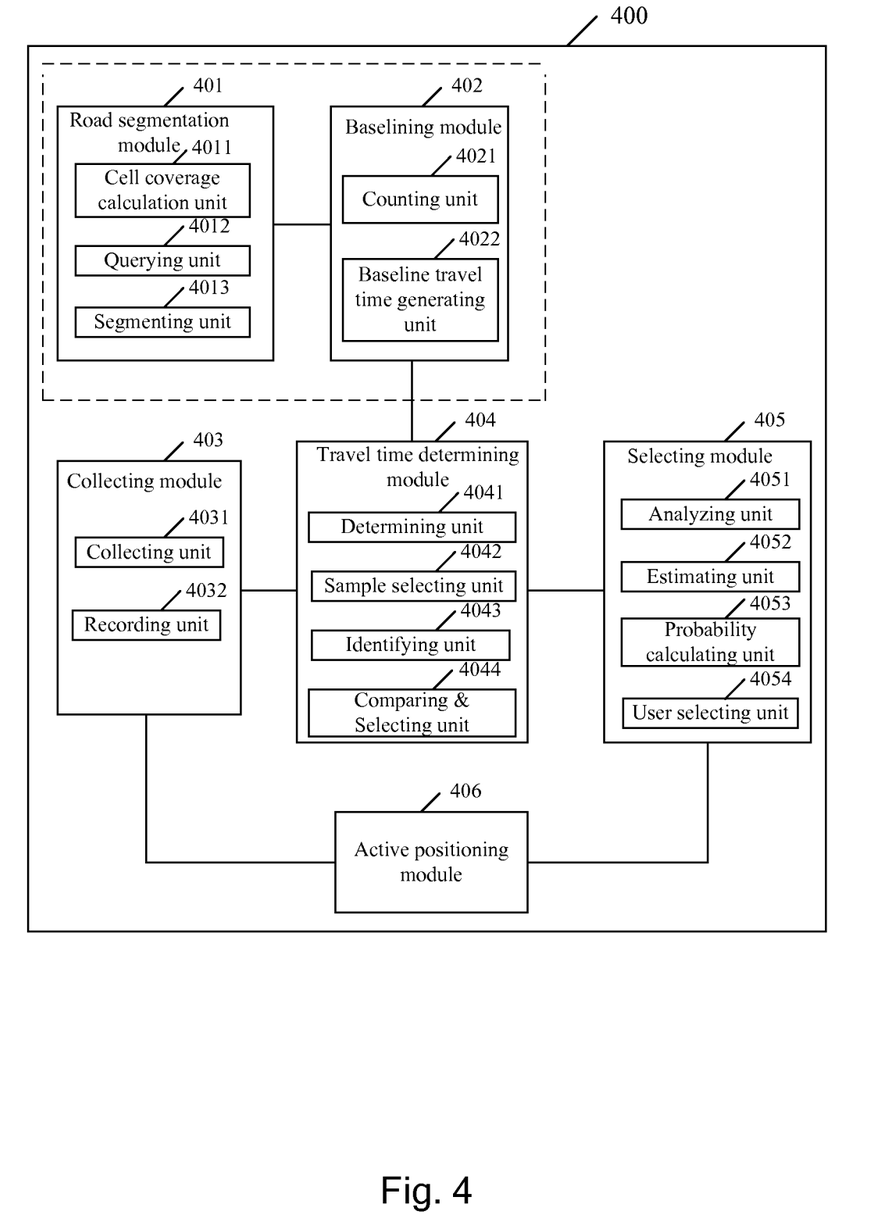
FIG. 4 is a schematic block diagram of an apparatus for determining real-time travel time of a road based on mobile communication network according to a preferred embodiment of the present invention.

Under the same inventive concept, FIG. 4 is a schematic block diagram of an apparatus for determining real-time travel time of a road based on mobile communication network according to an embodiment of the invention. The embodiment will be described in detail in conjunction with the drawing, wherein for the same parts as those in the previous embodiments, their description will be properly omitted.

As shown in FIG. 4, the apparatus 400 for determining real-time travel time of a road based on mobile communication network comprises: a road segmentation module 401 which divides a monitored road into a plurality of road segments according to cells related to the monitored road; a baselining module 402 which baselines historical travel time for the road segments to obtain baseline travel time of the road segments; a collecting module 403 which collects communication events happened to a mobile user currently on the monitored road to obtain travel time samples; a travel time determining module 404 which determines the real-time travel time of the corresponding road segment in the monitored road according to the travel time samples; a selecting module 405 which selects, for an undetermined road segment in the monitored road for which the real-time travel time is not determined, a candidate mobile user that is most likely to appear on the undetermined road segment; and a active positioning module 406 which actively positions the candidate mobile user and provides the actively positioning as one communication event of the candidate mobile user to the collecting module 403 to determine the real-time travel time of the undetermined road segment.

It should be appreciated that, although for the sake of simplicity, the road segmentation module 401 and the baselining module 402 are contained in the apparatus 400 of the present embodiment, a person skilled in the art will appreciate that these two modules are used to perform process on the monitored road and are not necessarily to be included in the apparatus 400.

In the apparatus 400 of the present embodiment, after the monitored road is determined, the road segmentation module 401 divides the monitored road into a plurality of road segments according to the cells in the mobile communication network that are related to the monitored road. In the road segmentation module 401, a cell coverage calculation unit 4011 obtains all the cells within a certain range along the monitored road and their position information, and provides them to a querying unit 4012. Then, the querying unit 4012 queries historical handover records related to the cells to find cell handover sequences corresponding to the monitored road. A segmenting unit 4013 segments the monitored road into a plurality of road segments according to the cell handover sequences provided by the querying unit 4012, wherein the middle points between two neighbouring cells are used as borders of the respective road segments, and the respective road segment may be identified by the identifier of the corresponding cell.

Then, in the baselining module 402, the historical travel time for the plurality of road segments are baselined to obtain the baseline travel time of the road segments. Specifically, a counting unit 4021 counts the historical travel time for the respective road segments according to the historical handover records in the cell handover sequence obtained in the road segmentation module 401, then a baseline travel time generating unit 4022 filters interference time (such as the interference time caused by walking or base station edge handover) out from the historical travel time for the respective road segments to generate the baseline travel time of the road segments.

Next, in the collecting module 403, a collecting unit 4031 collects two continuous communication events happened to the same mobile user within a predetermined time period, then a recording unit 4032 records the positions of two cells in which these two communication events happened and a time difference between these two communication events as the travel time sample.

Then the travel time determining module 404 determines the real-time travel time of the corresponding road segments in the monitored road according to the travel time samples obtained in the collecting module 403. Specifically, first, a determining unit 4041 determines, for each of the travel time samples, whether the positions of two cells in the travel time samples are the same, and determines that the travel time sample is a valid travel time sample when the positions of these two cells are different. Next, a sample selecting unit 4042 selects from the valid travel time samples provided by the determining unit 4041 an unambiguous sample that can uniquely determine the real-time travel time of a road segment, and an identifying unit 4043 identifies the road segment with the unambiguous sample. For an ambiguous sample in the valid travel time samples, a comparing and selecting unit 4044 compares the time difference in the ambiguous samples with the sum of the real-time travel time of the respective constituent road segments of each of the possible road segments corresponding to the ambiguous sample to select a possible road segment that is nearest in time, wherein for the constituent road segment for which the real-time travel time is not determined, the baseline travel time of the constituent road segment is used to replace the real-time travel time. Then the identifying unit 4043 identifies the possible road segment that is nearest in time with the ambiguous sample.

Further, the determining unit 4041 may further determine whether these two cells are neighbouring cells when the positions of these two cells are different, and determine that the travel time sample is a valid travel time sample when these two cells are not neighbouring cells.

Further, the travel time determining module 404 may further comprise an average value calculating unit. When a plurality of unambiguous samples exist for the same road segment, the average value calculating unit calculates an arithmetic average value of the plurality of the unambiguous samples, then the identifying unit 4043 identifies the road segment with the arithmetic average value.

For the undetermined road segment in the monitored road for which the real-time travel time is not determined, the selecting module 405 selects the candidate mobile user that is most likely to appear on the undetermined road segment. The policy for selecting the candidate mobile user has been described above and its description will be omitted here. In the selecting module 405, according to the valid travel time samples obtained in the travel time determining module 404, an analyzing unit 4051 analyzes the moving mode and speed vector of the corresponding mobile users on the monitored road. Then, an estimating unit 4052 estimates, for each of the corresponding mobile users, a travel speed at which the mobile user passes the undetermined road segment from current time to specified time. Specifically, the estimating unit 4052 estimates a minimum travel speed and a maximum travel speed of the mobile user according to formulas (1) and (2) respectively.

Then, a probability calculating unit 4053 calculates, for each of the mobile user, a travel probability that the mobile user can pass the undetermined road segment at the specified time according to the speed vector of the mobile user and the travel speed estimated in the estimating unit 4052. Specifically, the probability calculating unit 4053 calculates a prediction-related coefficient C as the travel probability of the mobile user according to formula (3). Then, a user selecting unit 4054 selects a certain number of the mobile users with large travel probability as the candidate mobile user.

As mentioned above, the above described selecting module 405 selects the candidate mobile user from the mobile user to which two continuous communication events happened in the different cells. When there is no mobile user to which two continuous communication events happened in the different cells on the undetermined road, the user selecting unit 4054 in the selecting module 405 may also select the mobile user to which only one communication event happened at a previous road segment of the undetermined road segment as the candidate mobile user.

Then, the active positioning module 406 actively positions the candidate mobile user provided by the selecting module 405, and provides the actively positioning as one communication event of the candidate mobile user to the collecting module 403 to determine the real-time travel time of the undetermined road segment.

It should be noted that the apparatus 400 of the present embodiment for determining real-time travel time of a road based on mobile communication network is operable to implement the method for determining real-time travel time of a road based on mobile communication network as shown in FIG. 1.

The method of the embodiment disclosed above may be implemented in software, hardware or combination of software and hardware. The hardware portion may be implemented by application specific logic. For example, the apparatus in the above embodiment for determining real-time travel time of a road based on mobile communication network and its components may be implemented by hardware circuit such as large scale integrated circuit or gate arrays, semiconductors such as logic chip or transistors or programmable hardware devices such as field programmable gate array, programmable logic device, or can be implemented by software which can be executed by various processors, or can be implemented by the combination of the above hardware circuit and software. The software portion may be stored in memory and executed by an appropriate instruction executing system such as microprocessor, personal computer (PC) or mainframe.

Although the method and apparatus of the present invention for determining real-time travel time of a road based on mobile communication network have been described through some exemplary embodiments, these embodiments are not exhaustive, those skilled in the art can realize various changes and modifications within the spirit and scope of the invention. Therefore, the present invention is not limited to these embodiments, the scope of which is only defined by appended claims.

The invention claimed is:

1. A method for determining travel time of a vehicle on a road, wherein the vehicle is operable within a mobile communication network, comprising:

collecting historical communication events of a mobile user in order to obtain travel samples, wherein the historical communication events indicate when the mobile user travelled along a monitored road;

determining a cell handover sequence from the historical communication events;

determining from the cell handover sequence, one of more road segments of the monitored road;

determining the travel time of the one or more road segments according to the travel time samples;

selecting, for an undetermined road segment of the monitored road for which the real-time travel time is not determined from the collected historical communication events, a candidate mobile user that is most likely to appear on the undetermined road segment;

calculating a travel probability of each mobile user to pass the undetermined road segment at a specified time, said candidate mobile user being selected based on said calculated travel probability, the travel probability of a mobile user being calculated as a function of an estimated speed and a speed vector of the mobile user on the monitored road, said estimated speed calculated by:

computing a minimum travel speed and a maximum travel speed of the each mobile user, the minimum and maximum travel speed of the each mobile user computed as a function of: a distance from a position of a cell to which the each mobile user belongs at a current time to a start point of the undetermined road segment, a coverage radius of the cell, a length of the undetermined road segment, and the current time;

actively positioning the candidate mobile user to obtain positioning information; and returning to the step of collecting communication events of a mobile user currently on a monitored road with the active positioning as one communication event for the candidate mobile user, to determine the real-time travel time of the undetermined road segment.

2. The method of claim 1, wherein the step of collecting historical communication related to a mobile user currently on a monitored road to obtain travel time samples further comprises:

collecting two continuous communication events related to the same mobile user within a predetermined time period; and recording positions of cells in which the two communication events took place and a time difference between the two communication events as the travel time sample.

3. The method of claim 2, wherein the step of determining the real-time travel time of a road segment in the monitored road according to the travel time samples further comprises:

determining, for each of the travel time samples, whether the positions of two cells in the travel time sample are the same, and determining that the travel time sample is a valid travel time sample when the positions of these two cells are different;

selecting, from the valid travel time samples, an unambiguous sample that can uniquely determine the real-time travel time of a certain road segment;

identifying the certain road segment with the unambiguous sample;

comparing, for an ambiguous sample in the valid travel time samples, the time difference in the ambiguous sample with a sum of the real-time travel time of the respective constituent road segments of each of the possible road segments corresponding to the ambiguous sample to select the possible road segment that is nearest in time, wherein for the constituent road segment for which the real-time travel time is not determined, a baseline travel time of the constituent road segment is used to replace its real-time travel time; and
identifying the possible road segment that is nearest in time with the ambiguous sample.

4. The method of claim 3, wherein the step of determining the real-time travel time of corresponding road segment in the monitored road according to the travel time samples further comprises:
determining whether these two cells are neighbouring cells when the positions of these two cells are different; and
determining that the travel time sample is valid when these two cells are not the neighbouring cells.

5. The method of claim 3, wherein the step of determining the real-time travel time of corresponding road segment on the monitored road according to the travel time samples further comprises:
calculating arithmetic average value of unambiguous samples when a plurality of unambiguous samples exists for the same road segment; and
identifying the road segment with the arithmetic average value.

6. The method of claim 1, wherein the step of selecting, for an undetermined road segment on the monitored road for which the real-time travel time is not determined, a candidate mobile user that is most likely to appear on the undetermined road segment comprises:
analyzing moving modes and speed vectors of the corresponding mobile users on the monitored road according to the valid travel time samples;
estimating, the travel speed of each corresponding mobile user passing the undetermined road segment from the current time to said specified time; and
selecting a certain number of mobile users with a large calculated travel probability as the candidate mobile user.

7. The method of claim 6, wherein the step of estimating, for each of the corresponding mobile users, the travel speed at which the mobile user passes the undetermined road segment from current time to specified time comprises:
estimating the minimum travel speed of the mobile user according to $$V_{min} = \frac{E[d] - R + K}{t - T},$$

wherein E[d] represents the distance from the position of the cell to which the mobile user belongs at the current time to the start point of the undetermined road segment, R represents the coverage radius of the cell, K represents the length of the undetermined road segment, t represents the specified time, T represents the current time; and
estimating the maximum travel speed of the mobile user according to $$V_{max} = \frac{E[d] + R + K}{t - T};$$

wherein the step of calculating a travel probability that the mobile user can pass the undetermined road segment at the specified time comprises:
calculating a prediction-related coefficient between the speed vector and the travel speed of the mobile user according to $$C = \min\left(1, \frac{V - V_{min}}{V_{max} - V_{min}}\right),$$

as the travel probability of the mobile user, wherein V represents the speed vector of the mobile user.

8. The method of claim 6, wherein the step of selecting a mobile user that is most likely to appear on the undetermined road segment further comprises:
selecting a mobile user to whom only one communication event happened in a previous road segment of the undetermined road segment as a candidate mobile user.

9. The method of claim 1, further comprising: before the step of collecting communication events happened to a mobile user currently on a monitored road,
dividing the monitored road into a plurality of road segments according to cells related to the monitored road; and
baselining historical travel time for the road segments to obtain baseline travel time of the respective road segments.

10. The method of claim 9, wherein the step of dividing the monitored road into a plurality of road segments according to cells related to the monitored road comprises:
obtaining all cells within a certain range along the monitored road and their position information;
querying historical handover records related to the cells to find a cell handover sequence corresponding to the monitored road; and
segmenting the monitored road into a plurality of road segments according to the cell handover sequence, wherein middle points between two neighbouring cells are regarded as borders of the respective road segments.

11. The method of claim 9, wherein the step of baselining historical travel time for the road segments to obtain baseline travel time of the respective road segments comprising:
counting the historical travel time for the road segment according to historical handover records in the cell handover sequence; and
filtering interference time out from the historical travel time to generate the baseline travel time of the road segment.

12. The method of claim 1, wherein the communication event is any one of location update service, call/short message service and cell handover.

13. An apparatus for determining travel time of a vehicle on a road, wherein the vehicle is operable within a mobile communication network, comprising:
a hardware processor coupled to a memory storage device, said storage device storing instructions for configuring said hardware processor to perform a method, said method comprising:
collecting historical communication events of a mobile user in order to obtain travel samples, wherein the historical communication events indicate when the mobile user travelled along a monitored road;
determining a cell handover sequence from the historical communication events;
determining from the cell handover sequence, one of more road segments of the monitored road;
determining the travel time of the one or more road segments according to the travel time samples;

selecting, for an undetermined road segment of the monitored road for which the real-time travel time is not determined from the collected historical communication events, a candidate mobile user that is most likely to appear on the undetermined road segment;

calculating a travel probability of each mobile user to pass the undetermined road segment at a specified time, said candidate mobile user being selected based on said calculated travel probability, the travel probability of a mobile user being calculated as a function of an estimated speed and a speed vector of the mobile user on the monitored road, said estimated speed calculated by:

computing a minimum travel speed and a maximum travel speed of the each mobile user, the minimum and maximum travel speed of the each mobile user computed as a function of: a distance from a position of a cell to which the each mobile user belongs at a current time to a start point of the undetermined road segment, a coverage radius of the cell, a length of the undetermined road segment, and the current time;

actively positioning the candidate mobile user to obtain positioning information; and returning to collecting communication events of a mobile user currently on a monitored road with the active positioning as one communication event for the candidate mobile user, to determine the real-time travel time of the undetermined road segment.

14. The apparatus of claim 13, wherein the hardware processor is further configured to:
collect two continuous communication events happened to the same mobile user within a predetermined time period; and
record the positions of the cells in which these two communication events happened and a time difference between these two communication events as the travel time sample.

15. The apparatus of claim 14, wherein the hardware processor is further configured to:
determine, for each of the travel time samples, whether the positions of two cells in the travel time sample are the same, and determining that the travel time sample is a valid travel time sample when the positions of these two cells are different;
select from the valid travel time samples an unambiguous sample that can uniquely determine the real-time travel time of a certain road segment;
identify the certain road segment with the unambiguous sample;
compare, for an ambiguous sample in the valid travel time samples, a time difference in the ambiguous sample with a sum of the real-time travel time of the respective constituent road segments of each of the possible road segments corresponding to the ambiguous sample to select the possible road segment that is nearest in time, wherein for the constituent road segment for which the real-time travel time is not determined, its real-time travel time is replaced with a baseline travel time of the constituent road segment;
wherein the the hardware processor identifies the possible road segment that is nearest in time with the ambiguous sample.

16. The apparatus of claim 15, wherein the hardware processor is further configured to determine whether these two cells are neighbouring cells when the positions of these two cells are different, and to determine that the travel time sample is valid when these two cells are not neighbouring cells.

17. The apparatus of claim 15, wherein the hardware processor is further configured to calculate, when a plurality of unambiguous samples exists for the same road segment, an arithmetic average value of the plurality of unambiguous samples; wherein the hardware processor identifies the road segment with the arithmetic average value.

18. The apparatus of claim 13, wherein the hardware processor is further configured to:
analyze moving modes and speed vectors of the corresponding mobile users on the monitored road according to the valid travel time samples;
estimate, for each of the corresponding mobile users, the travel speed at which the mobile user passes the undetermined road segment from the current time to said specified time; and
select a certain number of mobile users with a large calculated travel probability as the candidate mobile user.

19. The apparatus of claim 18, wherein the hardware processor is further configured to: estimate the minimum travel speed of the mobile user according to $$V_{min} = \frac{E[d] - R + K}{t - T},$$

wherein E[d] represents the distance from the position of the cell to which the mobile user belongs at the current time to the start point of the undetermined road segment, R represents the coverage radius of the cell, K represents the length of the undetermined road segment, t represents the specified time, T represents the current time; and to estimate the maximum travel speed of the mobile user according to $$V_{max} = \frac{E[d] + R + K}{t - T};$$

and
calculate a prediction-related coefficient between the speed vector and the travel speed of the mobile user as the travel probability of the mobile user according to $$C = \min\left(1, \frac{V - V_{min}}{V_{max} - V_{min}}\right),$$

wherein V represents the speed vector of the mobile user.

20. The apparatus of claim 18, wherein the hardware processor is further configured to select the mobile user to whom only one communication event happened in a previous road segment of the undetermined road segment.

21. The apparatus of claim 13, wherein the hardware processor is further configured to:
divide the monitored road into a plurality of road segments according to cells related to the monitored road; and
baseline historical travel time for the road segments to obtain the baseline travel time of the respective road segments.

22. The apparatus of claim 21, wherein the hardware processor is further configured to:
obtain all the cells within a certain range along the monitored road and their position information;

query historical handover records related to the cells to find a cell handover sequence corresponding to the monitored road; and segment the monitored road into a plurality of road segments according to the cell handover sequence, wherein middle points between two neighbouring cells are regarded as borders of the respective road segments.

23. The apparatus of claim 21, wherein the hardware processor is further configured to:

count the historical travel time for the road segment according to the historical handover records in the cell handover sequence; and filter interference time out from the historical travel time to generate the baseline travel time of the road segment.

24. A computer software program comprising computer program code to, when loaded into a non-transitory computer readable medium and executed, perform all the steps of a method for determining travel time of a vehicle on a road, wherein the vehicle is operable within a mobile communication network, comprising:

collecting historical communication events of a mobile user in order to obtain travel samples, wherein the historical communication events indicate when the mobile user travelled along a monitored road;

determining a cell handover sequence from the historical communication events;

determining from the cell handover sequence, one of more road segments of the monitored road;

determining the travel time of the one or more road segments according to the travel time samples;

selecting, for an undetermined road segment of the monitored road for which the real-time travel time is not determined from the collected historical communication events, a candidate mobile user that is most likely to appear on the undetermined road segment;

calculating a travel probability of each mobile user to pass the undetermined road segment at a specified time, said candidate mobile user being selected based on said calculated travel probability, the travel probability of a mobile user being calculated as a function of an estimated speed and a speed vector of the mobile user on the monitored road, said estimated speed calculated by:

computing a minimum travel speed and a maximum travel speed of the each mobile user, the minimum and maximum travel speed of the each mobile user computed as a function of: a distance from a position of a cell to which the each mobile user belongs at a current time to a start point of the undetermined road segment, a coverage radius of the cell, a length of the undetermined road segment, and the current time;

actively positioning the candidate mobile user to obtain positioning information; and returning to the step of collecting communication events of a mobile user currently on a monitored road with the active positioning as one communication event for the candidate mobile user, to determine the real-time travel time of the undetermined road segment.

25. The method of claim 4, wherein the step of determining the real-time travel time of corresponding road segment on the monitored road according to the travel time samples further comprises:

calculating arithmetic average value of unambiguous samples when a plurality of unambiguous samples exists for the same road segment; and identifying the road segment with the arithmetic average value.

26. The apparatus of claim 16, wherein the hardware processor is further configured to calculate, when a plurality of unambiguous samples exists for the same road segment, an arithmetic average value of the plurality of unambiguous samples; wherein the hardware processor identifies the road segment with the arithmetic average value.

\* \* \* \* \*